(No Model.)
G. S. SPRING.
ATTACHMENT FOR COFFEE AND TEA POTS.
No. 362,550. Patented May 10, 1887.
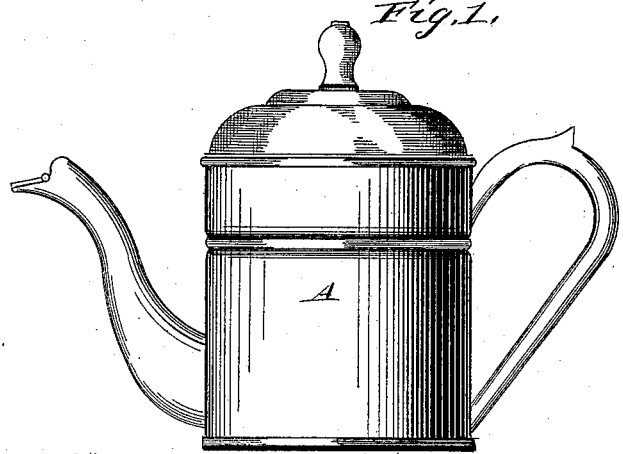
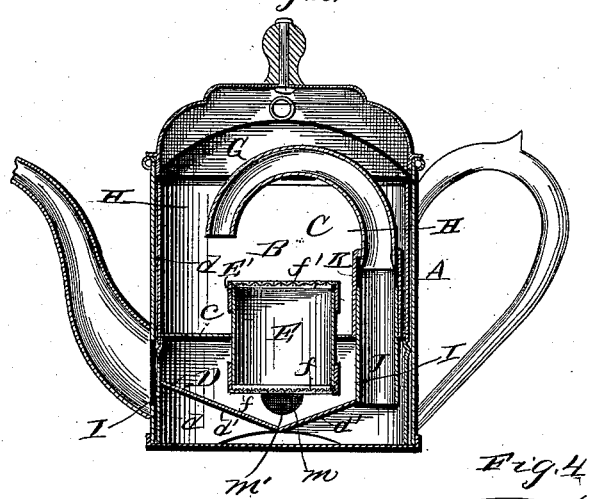
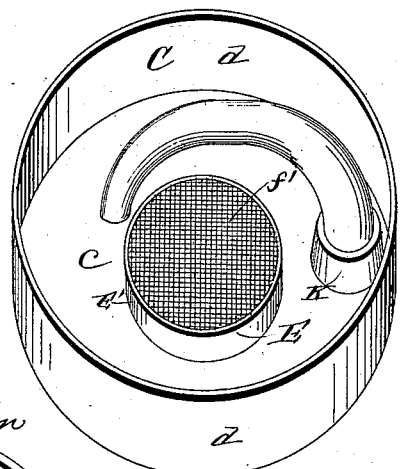
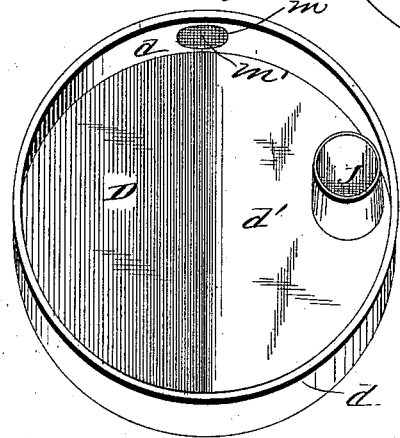
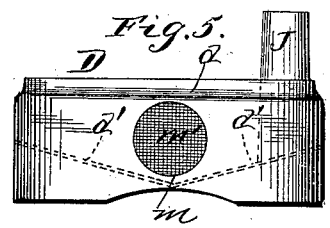
Witnesses
Chas. L. Taylor
[signature]
Inventor
Geo. S. Spring
By his Attorneys
[signature]

UNITED STATES PATENT OFFICE.

GEORGE SQUIRE SPRING, OF GENEVA, OHIO.

ATTACHMENT FOR COFFEE AND TEA POTS.

SPECIFICATION forming part of Letters Patent No. 362,550, dated May 10, 1887.

Application filed November 20, 1886. Serial No. 219,500. (No model.)

*To all whom it may concern:*

Be it known that I, GEORGE SQUIRE SPRING, a citizen of the United States, residing at Geneva, in the county of Ashtabula and State of Ohio, have invented a new and useful Improvement in Attachments for Coffee and Tea Pots, of which the following is a specification.

My invention relates to improvements in attachments for coffee and tea pots; and it consists of the peculiar combination and novel construction and arrangement of the various parts for service, substantially as hereinafter fully described, and particularly pointed out in the claims.

The primary object of my invention is to provide an improved attachment which can be very readily and easily applied to any class of coffee or tea pot, which shall extract the greater portion of the strength and essence of the coffee and tea placed therein and retain all of the grounds or leaves which are strained from the liquid coffee and tea, that is emptied from the pot proper in a clarified condition and fit for immediate use, thereby effecting a saving and economy in the quantity of ground coffee or tea and the cost of the eggs and other substances which are subsequently used to clarify the liquid coffee after it has boiled.

In the accompanying drawings, which illustrate a coffee and tea pot attachment embodying my invention, Figure 1 is an elevation of the coffee or tea pot to receive my attachment. Fig. 2 is a vertical central sectional view through the pot and my attachment. Figs. 3 and 4 are detached views of the sections of my invention. Fig. 5 is a side elevation of the lower section.

Referring to the drawings, in which like letters of reference denote corresponding parts in all the figures, A designates the coffee or tea pot to which my invention is to be applied.

B designates my improved attachment, which comprises a receptacle that is designed to receive the coffee or tea which is to be boiled or cooked, the peculiar construction of which I will now proceed to describe.

The receptacle is made in two sections, C and D, each of which is provided with a shell, $d$, which is cylindrical in form and detachably connected together at their contiguous edges, so that the lower edge of one shell fits over or within the upper edge of the other shell. The upper section, C, of my improved receptacle is provided with a horizontal diaphragm or bottom, $c$, which is rigidly affixed to the cylindrical shell thereof near its lower edge, and through the center of this diaphragm passes a vertical central tube, E, which is rigidly affixed at its middle to the diaphragm, so that the upper and lower ends of the tube are arranged above and beneath the plane of the said diaphragm. The lever end of this central fixed tube is closed by means of a screen or sieve, $f$, which is rigidly affixed or secured thereto in any suitable manner, and the upper end of the said fixed tube is provided with a removable cap, E', which fits over the same, this cap having a screen or sieve, $f'$, so that the liquid and steam from the chamber of the upper section can pass into the tube through the screen or sieve in the removable cap thereof, as is obvious. The upper section of the receptacle is provided with a removable lid or cover, G, of any approved pattern, so that ready access can be had to the chamber of the upper section to place the tea or coffee therein, and also to cleanse the same. The lower section, D, of the receptacle B is provided with a bottom, $d'$, that is rigidly affixed or secured to the cylindrical shell thereof, near the lower edge of the said shell. This fixed bottom to the lower section of the receptacle is made substantially V-shaped in cross-section—that is to say, it is provided with the inclined sides $d'$, which meet at their lower edges, while their upper edges are affixed to the shell of the section of which they form a part.

When the sections of the receptacle are fitted together and the removable cover or lid fitted on the upper section, the receptacle is divided into an upper and a lower chamber, H and I, respectively, the upper chamber being formed by the shell and bottom of the upper section and the removable cover G, and the lower chamber, I, being formed by the shell and bottom of the lower section and horizontal diaphragm or bottom of the upper section. The central fixed tube, E, extends into both of these upper and lower chambers, and the liquid is free to circulate through the screens or sieves and the said tubes, so as to pass from the upper chamber into the lower chamber, as will be readily seen.

The bottom of the lower section of the shell has a vertical tube, J, rigidly affixed to the same, near one side thereof, and this tube opens through the said bottom of the lower section and extends up into the lower end of another tube, K, which is affixed to the bottom or diaphragm of the upper section, the tubes thus forming practically a continuation of one another, so as to establish communication between the upper chamber of the receptacle B and the chamber of the coffee or tea pot. The upper end of the tube K is curved inwardly and downwardly, so as to discharge the contents of the tubes upon the horizontal bottom or diaphragm of the upper section.

The sections of the receptacle can be readily separated in order to cleanse the same, and as readily replaced, the two tubes permitting of this adjustment of the parts without hinderance.

The cylindrical shell of the lower section of the receptacle is provided at one side with a transverse opening, m, which is formed therein above the bottom, and this opening is protected by a screen or sieve, m', which is fitted over the opening and rigidly affixed to the shell.

This being the construction of my improved attachment for coffee and tea pots, the operation is as follows: The water is placed in the pot A, and the coffee or tea is placed in the upper chamber, H, of the receptacle, upon the horizontal bottom or diaphragm and around the vertical fixed tube E thereof. The cover or lid G is placed on the upper section to close the chamber thereof, and the receptacle B is placed in the pot A, the lid thereof being fitted tightly in place. The boiling water and the steam generated thereby in the pot A passes beneath the V-shaped bottom of the receptacle and is drawn through the communicating tubes J K, whence it is discharged upon the coffee or tea in the upper chamber of the receptacle, so that the coffee or tea is subjected to the action of the boiling water, which extracts all of the strength and essence therefrom. The liquid coffee or tea from the upper chamber passes through the central fixed tube and the strainers thereof into the lower chamber, whence it escapes through the outlet opening m, all of the grounds or dregs in the liquid being retained in the chambers, as they cannot pass through the screens, so that the coffee is fit for use when it escapes into the pot A without clarifying it by the use of eggs or other substances, as is now commonly practiced.

My invention is simple and cheap of construction and easily cleaned, as ready access to all of the parts thereof can be had very easily.

The device can be used in any kind of coffee or tea pot.

Having thus fully described my invention, what I claim as new, and desire to secure by Letters Patent, is—

1. As a new article of manufacture, an attachment for coffee and tea pots, comprising a shell having a horizontal diaphragm dividing the same into the upper and lower chambers, one of which has an outlet-opening, a vertical central tube fixed to the diaphragm and having the open screened ends extended into the chambers, and a circulating-tube arranged to one side of the central tube and having its lower end opening through the bottom of the lower chamber and the upper end into the upper chamber, as and for the purpose set forth.

2. An attachment for coffee and tea pots, comprising a divided sectional shell provided with a horizontal fixed diaphragm and a closed bottom, a central tube fixed to the diaphragm and having the screened ends extended into the chambers of the shell, and a sectional tube opening through the bottom of the lower chamber and extended into the upper chamber to discharge its contents therein, one section of the said tube being secured to the diaphragm and the other section to the bottom, the meeting ends of the said tube-sections being suitably connected to form a continuous passage, as and for the purpose set forth.

3. An attachment for coffee and tea pots, comprising a receptacle having the upper and lower chambers divided by a fixed horizontal diaphragm and a fixed bottom in the lower end of the receptacle, said bottom being dished, a vertical tube affixed centrally to the horizontal diaphragm and having its ends extended into the chambers and closed by screens, and a vertical circulating-tube arranged at one side of the central tube and passing through the diaphragm and the dished bottom, the lower end of the circulating-tube communicating with the space beneath the bottom and the upper end of the tube opening into the upper chamber, the lower chamber having an outlet, m, formed in one of its walls beneath the horizontal diaphragm, as and for the purpose described.

In testimony that I claim the foregoing as my own I have hereto affixed my signature in presence of two witnesses.

GEORGE SQUIRE SPRING.

Witnesses;
ARTHUR R. GLEASON,
C. R. TURNER.